US009043806B2

(12) United States Patent
Igura

(10) Patent No.: US 9,043,806 B2
(45) Date of Patent: May 26, 2015

(54) INFORMATION PROCESSING DEVICE AND TASK SWITCHING METHOD

(75) Inventor: Hiroyuki Igura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 98 days.

(21) Appl. No.: 13/578,917

(22) PCT Filed: Jan. 21, 2011

(86) PCT No.: PCT/JP2011/000328
§ 371 (c)(1),
(2), (4) Date: Aug. 14, 2012

(87) PCT Pub. No.: WO2011/135759
PCT Pub. Date: Nov. 3, 2011

(65) Prior Publication Data
US 2013/0036426 A1 Feb. 7, 2013

(30) Foreign Application Priority Data

Apr. 30, 2010 (JP) .................................. 2010-104880

(51) Int. Cl.
*G06F 9/46* (2006.01)
*G06F 9/48* (2006.01)
*G06T 1/20* (2006.01)

(52) U.S. Cl.
CPC ........ *G06F 9/461* (2013.01); *G06F 9/48* (2013.01); *G06T 1/20* (2013.01)

(58) Field of Classification Search
None
See application file for complete search history.

(56) References Cited

U.S. PATENT DOCUMENTS

| 2004/0160446 A1 | 8/2004 | Gosalia et al. |
| 2006/0061579 A1 | 3/2006 | Washizu |
| 2010/0005275 A1 | 1/2010 | Kamigata |

FOREIGN PATENT DOCUMENTS

| CN | 1609812 A | 4/2005 |
| CN | 101324839 A | 12/2008 |
| EP | 0239078 A2 | 9/1987 |
| JP | S62221732 A | 7/1989 |

(Continued)

OTHER PUBLICATIONS

Translated International Preliminary Report on Patentability for PCT/JP2011/000328, Dec. 10, 2012.*

(Continued)

*Primary Examiner* — Qing Wu
(74) *Attorney, Agent, or Firm* — Sughrue Mion, PLLC

(57) ABSTRACT

Disclosed is an information processing device and a task switching method that can reduce the time required for switching of tasks in a plurality of coprocessors. The information processing device (30) includes a processor core (301); coprocessors (311 to 31n) including operation units (321 to 32n) that perform operation in response to a request from the processor core (301) and operation storage units (331 to 22n) that store the contents of operation of the operation units (321 to 32n), save storage units (351 to 35n) that store the saved contents of operation, a task switching control unit (302) that outputs a save/restore request signal when switching a task on which operation is performed by the coprocessors (311 to 31n), and save/restore units (341 to 34n) that perform at least one of saving of the contents of operation in the operation storage units (331 to 33n) to the save storage units (351 to 35n) and restoration of the contents of operation in the save storage units (351 to 35 n) to the operation storage units (331 to 33n) in response to the save/restore request signal.

9 Claims, 8 Drawing Sheets

(56) References Cited

FOREIGN PATENT DOCUMENTS

| | | |
|---|---|---|
| JP | H04051329 A | 2/1992 |
| JP | H04095137 A | 3/1992 |
| JP | H06004305 A | 1/1994 |
| JP | 2003-512671 A | 4/2003 |
| JP | 2006092218 A | 4/2006 |
| WO | 2008114415 A1 | 9/2008 |

OTHER PUBLICATIONS

The international search report for PCT/JP2011/000328, dated Mar. 29, 2011.

Chinese Office Action for CN Application No. 201180021923.X issued on Jan. 7, 2015 with English Translation.

Japanese Office Action for JP Application No. 2012-512625 mailed on Mar. 31, 2015 with English Translation.

* cited by examiner

INFORMATION PROCESSING DEVICE AND TASK SWITCHING METHOD

TECHNICAL FIELD

The present invention relates to an information processing device and a task switching method and, particularly, to a technique of switching tasks in a plurality of coprocessors.

BACKGROUND ART

Recently, a dedicated LSI (Large Scale Integration) that performs signal processing by a connecting dedicated coprocessor to an embedded processor core rather than using dedicated hardware becomes widespread to enhance the flexibility of processing. In this case, there arises a need to process a plurality of tasks in one processor core in order to improve the area efficiency. Particularly, in the case of carrying out a plurality of tasks with different properties in one processor core, situations in which a plurality of coprocessors are connected to one processor core will increase.

Typically, in the case of switching tasks, data of a coprocessor and an arithmetic register existing in the coprocessor is temporarily saved. Then, when it is switched back to the original task, the saved data needs to be restored to the arithmetic register.

In most cases, the data save/restore process is performed by the processor core according to an instruction sequence described in software. However, the method requires, each time switching tasks, performing a process of reading data of the current task from the arithmetic register, writing the data into the memory, reading data of the next task from the memory, and writing the data into the arithmetic register, for each of the arithmetic registers. Further, in the case where a plurality of coprocessors are connected, the processor core needs to perform the above process one by one for each of the plurality of coprocessors. As a result, when task switching is done frequently, the overhead caused by the processing time required for the save and restore operation increases. This raises a problem that task switching is difficult in real-time processing.

To solve this problem, Patent Literatures 1 and 2, for example, propose a technique of speeding up the task switching process by distinguishing between tasks using a coprocessor and tasks not using it and skipping saving and restoration of coprocessor context. Further, Patent Literature 3, for example, proposes a technique of speeding up the task switching by saving only the arithmetic register used for the task.

However, even with use of those techniques, when the number of coprocessors used increases, it is necessary to perform the arithmetic register save/restore process for each of the relevant coprocessors at the time of task switching. Further, because task switching is not conducted until the save/restore operation ends, it still takes a long time for task switching.

CITATION LIST

Patent Literature

[PTL 1] Japanese Unexamined Patent Application Publication No. H04-095137
[PTL 2] Japanese Unexamined Patent Application Publication No. H04-051329
[PTL 3] Japanese Unexamined Patent Application Publication No. H06-004305

SUMMARY OF INVENTION

Technical Problem

As described above in Background Art, each time switching tasks, a processor core needs to perform a process of reading data of the current task from the arithmetic register, writing the data into the memory, reading data of the next task from the memory, and writing the data into the arithmetic register, for each of the arithmetic registers. Further, in the case where a plurality of coprocessors are connected, the processor core needs to perform the above process one by one for each of the plurality of coprocessors. As a result, there is a problem that it takes a long time to switch tasks in a plurality of coprocessors.

To solve the above problem, an exemplary object of the present invention is thus to provide an information processing device and a task switching method that can reduce the time required for task switching in a plurality of coprocessors.

Solution to Problem

An information processing device according to a first exemplary aspect of the invention includes a processor core, a plurality of coprocessors including an operation means for performing operation in response to a request from the processor core, and an operation storage means for storing contents of operation of the operation means, a plurality of save storage means for storing the contents of operation saved from the operation storage means, the plurality of save storage means respectively corresponding to the plurality of coprocessors, a task switching control means for outputting a save/restore request signal requesting saving/restoration of the contents of operation when switching a task on which operation is performed by at least one of the plurality of coprocessors from a first task to a second task, and a plurality of save/restore means respectively corresponding to the plurality of coprocessors, wherein each of the plurality of save/restore means performs at least one of saving of the contents of operation related to the first task stored in the operation storage means to the save storage means and restoration of the contents of operation related to the second task stored in the save storage means to the operation storage means.

A task switching method according to a second exemplary aspect of the invention is a task switching method that switches a task on which operation is performed by a plurality of coprocessors that perform operation of a task in response to a request from a processor core, the method including outputting, by a processor core, a save/restore request signal requesting saving/restoration of contents of operation of a task to the plurality of coprocessors when switching a task on which operation is performed by at least one of the plurality of coprocessors from a first task to a second task, and performing, by each of the plurality of coprocessors, at least one of saving of the contents of operation of the first task and restoration of the contents of operation of the second task in response to the save/restore request signal output from the processor core.

Advantageous Effects of Invention

According to the exemplary aspects of the invention described above, it is possible to provide an information processing device and a task switching method that can reduce the time required for task switching in a plurality of coprocessors.

DESCRIPTION OF EMBODIMENTS

Figure 1:
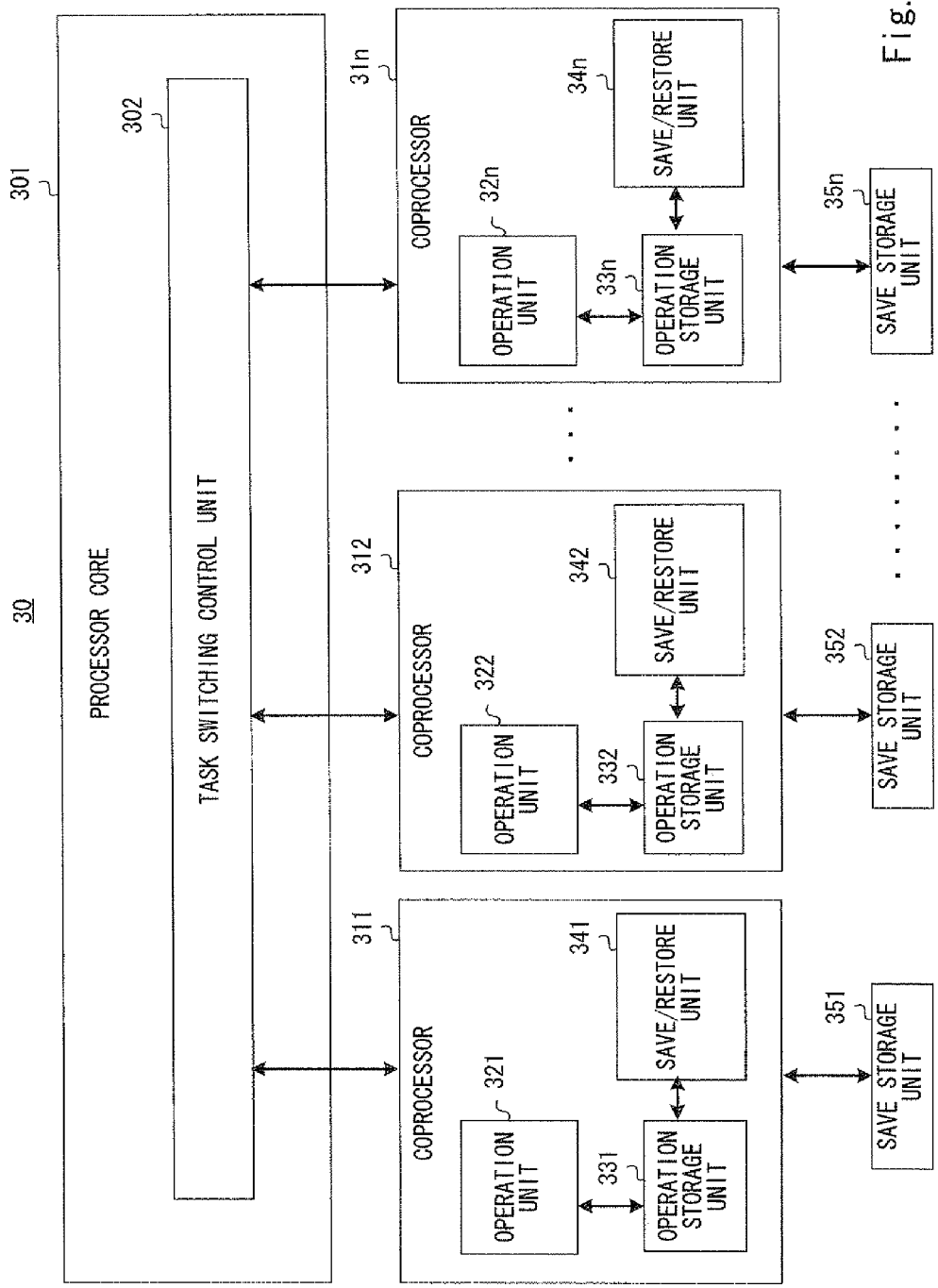
FIG. 1 is a block diagram showing a configuration of an information processing device according to an exemplary embodiment of the invention.

An information processing device is described as a general outline of a task switching speed-up circuit according to an exemplary embodiment of the invention with reference to FIG. 1. FIG. 1 is a block diagram showing a configuration of an information processing device according to an exemplary embodiment of the invention.

An information processing device 30 includes a processor core 301, coprocessors 311 to 31$n$, and save storage units 351 to 35$n$. $n$ is any positive integer. The processor core 301 includes a task switching control unit 302. The coprocessor 311 includes an operation unit 321, an operation storage unit 331, and a save/restore unit 341. The coprocessors 312 to 31$n$ have the same configuration as the coprocessor 311 and thus description thereof is omitted.

The processor core 301 makes a request for operation of a task to the coprocessors 311 to 31$n$.

When switching a task on which operation is performed by at least one of the plurality of coprocessors 311 to 31$n$ from a first task to a second task, the task switching control unit 302 outputs a save/restore request signal to the coprocessor. The save/restore request signal is a signal to request saving or restoration of the contents of operation stored in the operation storage unit.

The coprocessors 311 to 31$n$ perform operation of a task.

The operation units 321 to 32$n$ perform arithmetic operation in response to a request from the processor core 301.

The operation storage units 331 to 33$n$ store the contents of operation of the operation units 321 to 32$n$, respectively.

The save/restore units 341 to 34$n$ perform at least one of saving of the contents of operation related to the first task stored in the operation storage units 331 to 33$n$ to the save storage units 351 to 35$n$, respectively, and restoration of the contents of operation related to the second task stored in the save storage units 351 to 35$n$ to the operation storage units 331 to 33$n$, respectively, in response to the save/restore request signal. Thus, the save/restore units 341 to 34$n$ correspond to the plurality of coprocessors 311 to 31$n$, respectively.

The save storage units 351 to 35$n$ store the contents of operation saved from the operation storage units 331 to 33$n$, respectively. Thus, the save storage units 351 to 35$n$ correspond to the plurality of coprocessors 311 to 31$n$, respectively.

Processing of the information processing device according to the exemplary embodiment of the invention is described hereinafter.

When switching a task on which operation is performed by at least one of the plurality of coprocessors 311 to 31$n$ from the first task to the second task, the task switching control unit 302 outputs a save/restore request signal to the save/restore unit included in the coprocessor. It is assumed that the save/restore request signal is output to the save/restore unit 341 included in the coprocessor 311. In response to the save/restore request signal, the save/restore unit 341 performs at least one of saving of the contents of operation related to the first task stored in the operation storage unit 331 to the save storage unit 351 and restoration of the contents of operation related to the second task stored in the save storage unit 351 to the operation storage unit 331.

An exemplary embodiment of the invention is described hereinafter in detail with reference to the drawings.

Figure 2:
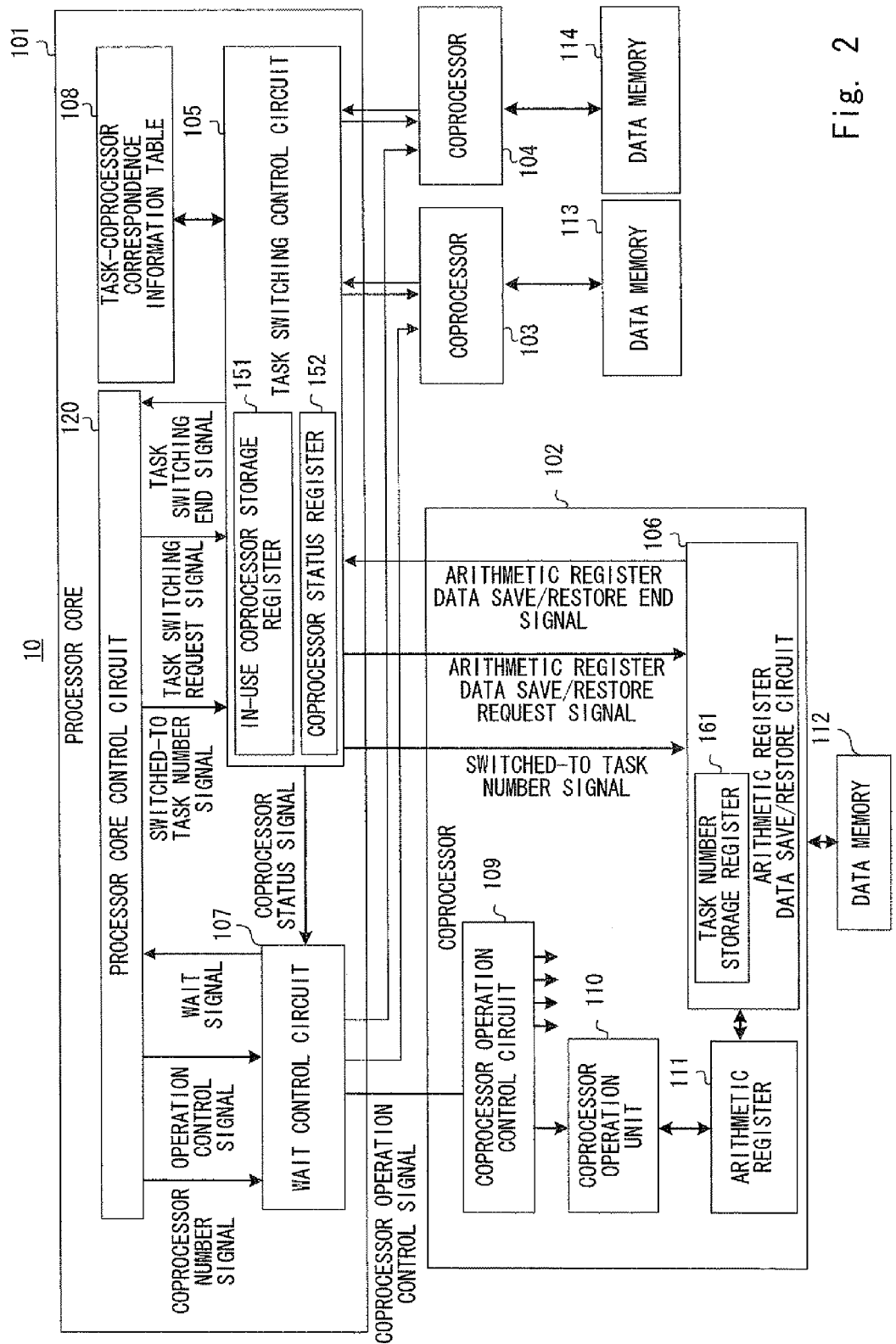
FIG. 2 is a block diagram showing a configuration of a task switching speed-up circuit according to an exemplary embodiment of the invention.

FIG. 2 is a block diagram showing a configuration of a task switching speed-up circuit according to an exemplary embodiment of the invention.

A task switching speed-up circuit 10 includes a processor core 101, coprocessors 102, 103 and 104, and data memories 112 to 114.

The processor core 101 includes a task switching control circuit 105, a wait control circuit 107, a task-coprocessor correspondence information table 108, and a processor core control circuit 120. The task switching control circuit 105 includes an in-use coprocessor storage register 151 and a coprocessor status register 152.

The coprocessor 102 includes an arithmetic register data save/restore circuit 106, a coprocessor operation control circuit 109, a coprocessor operation unit 110, and an arithmetic register 111. Note that the coprocessors 103 and 104 have the same configuration as the coprocessor 102 and thus description thereof is omitted. The arithmetic register data save/restore circuit 106 includes a task number storage register 161.

The processor core 101 includes an operation unit (not shown). The processor core control circuit 120 causes the operation unit to perform a task decided for execution. Further, the processor core control circuit 120 outputs a task switching request signal to the task switching control circuit 105. The task switching request signal is a signal to request switching to a task decided for execution. Furthermore, the processor core control circuit 120 outputs a switched-to task number signal to the task switching control circuit 105. The switched-to task number signal is a signal indicating the task number of a switched-to task that has been decided for execution.

The coprocessors 102 to 104 perform arithmetic operation of a task in response to a request from the processor core 101.

The task switching request signal and the switched-to task number signal are input to the task switching control circuit 105 from the processor core control circuit 120 in the processor core 101. When task switching is done in the coprocessor to which task switching has been requested, the task switching control circuit 105 outputs a task switching end signal to the processor core control circuit 120.

Further, the task switching control circuit 105 outputs an arithmetic register value save/restore request signal and the switched-to task number signal to the coprocessors 102, 103 and 104. Each of the coprocessors 102 to 104 performs saving/restoration of data to be stored into the arithmetic register 111 in response to the arithmetic register data save/restore request signal. The task to be executed is thereby switched in each of the coprocessors 102 to 104. When the saving/restoration of data ends, each of the coprocessors 102 to 104 outputs an arithmetic register save/restore end signal to the task switching control circuit 105.

The task-coprocessor correspondence information table 108 is also connected to the task switching control circuit 105. The task switching control circuit 105 acquires information about a coprocessor to be used for each task using the task-coprocessor correspondence information table 108. The task switching control circuit 105 outputs the arithmetic register value save/restore request signal to the coprocessor based on the acquired information.

Further, the task switching control circuit 105 outputs a coprocessor status signal indicating whether each of the coprocessors 102 to 104 is in the process of task switching or not to the wait control circuit 107. The task switching control circuit 105 serves as the task switching control unit 302.

The arithmetic register data save/restore circuit 106 performs at least one of saving of the contents of operation related to a task before switching that is stored in the arithmetic register 111 to the data memory 112 and restoration of the contents of operation related to a task after switching that is stored in the data memory 112 to the arithmetic register 111 in response to the arithmetic register data save/restore request signal. When the saving/restoration of the contents of operation of a task ends, the arithmetic register data save/restore circuit 106 outputs the arithmetic register save/restore end signal to the task switching control circuit 105. At the time when the saving/restoration of the contents of operation related to a task ends in a coprocessor, task switching in the coprocessor ends. The arithmetic register data save/restore circuit 106 serves as the save/restore units 341 to 34$n$.

An operation control signal and a coprocessor number signal are input to the wait control circuit 107 from the processor core control circuit 120. The operation control signal is a signal to control arithmetic operation on the coprocessors 102 to 104. The coprocessor number signal is a signal indicating the coprocessor number that is controlled by the operation control signal. The wait control circuit 107 outputs a coprocessor operation control signal to the coprocessor operation control circuit 109 based on the operation control signal output from the processor core control circuit 120 and the coprocessor status signal output from the task switching control circuit 105. Further, the wait control circuit 107 outputs a wait signal to the processor core control circuit 120 when a coprocessor among the coprocessors 102 to 104 on which the processor core 101 intends to control operation by the coprocessor operation control signal is in the process of task switching based on the coprocessor status signal. The wait signal is a signal to halt processing in the processor core 101.

The task-coprocessor correspondence information table 108 stores correspondence information that associates a task and a coprocessor to execute the task. The task-coprocessor correspondence information table 108 outputs a coprocessor signal to the task switching control circuit 105 in response to the switched-to task number signal that is output from the task switching control circuit 105. The coprocessor signal is a signal indicating a coprocessor to execute a task with the task number indicated by the switched-to task number signal.

Note that the task-coprocessor correspondence information table 108 specifies a processor to execute a task with the task number indicated by the switched-to task number signal on the basis of the correspondence information stored therein. The task-coprocessor correspondence information table 108 includes a storage device such as a memory or hard disk, for example. The correspondence information is loaded from another storage device to the task-coprocessor correspondence information table 108 upon startup of a program containing a task to be executed in this exemplary embodiment, for example.

The coprocessor operation control circuit 109 controls the coprocessor operation unit 110. The coprocessor operation control circuit 109 causes the coprocessor operation unit 110 to perform arithmetic operation of a task in response to the coprocessor operation control signal that is output from the processor core 101 through the wait control circuit 107.

The coprocessor operation unit 110 performs arithmetic operation of a task to be executed. The coprocessor operation unit 110 stores the contents of operation of the task into the arithmetic register 111. The coprocessor operation unit 110 serves as the operation units 321 to 32$n$.

Data as the contents of operation of the task is stored into the arithmetic register 111 by the coprocessor operation unit 110. The arithmetic register 111 serves as the operation storage units 33$n$ to 33$n$.

The data stored in the arithmetic register 111 is saved to the data memory 112 at the time when the coprocessor 102 switches a task to be executed. Likewise, data stored in the corresponding arithmetic registers (not shown) are saved to the data memories 113 and 114, respectively, at the time when the coprocessors 103 and 104 switch tasks to be executed. The data memories 112 to 114 serve as the save storage units 351 to 35$n$.

The processor core control circuit 120 manages a task to be executed in the processor core 101 and the coprocessors 102 to 104. The processor core control circuit 120 makes a request for switching of tasks in the coprocessors 102 to 104 to the task switching control circuit 105 by the task switching request signal. The processor core control circuit 120 makes a request for operation of tasks to the coprocessors 102 to 104 by the operation control signal.

The in-use coprocessor storage register 151 stores information indicating a coprocessor that is in use for executing a task. The information stored in the in-use coprocessor storage register 151 is used as information indicating a coprocessor that has been executing a task before switching at the time when the coprocessor 102 switches a task to be executed.

The coprocessor status register 152 stores information indicating whether the coprocessors 102 to 104 are in the process of task switching or not.

The task number storage register 161 stores information indicating the task number of a task before switching.

Description of Operation

The operation of the task switching speed-up circuit 10 according to the exemplary embodiment of the invention is described hereinafter with reference to the block diagram of FIG. 2.

When the task switching request signal and the switched-to task number signal are notified from the processor core control circuit 120 of the processor core 101, the task switching control circuit 105 outputs the switched-to task number signal to the task-coprocessor correspondence information table 108. The task-coprocessor correspondence information table 108 outputs the coprocessor number signal indicating a coprocessor to execute the task with the task number indicated by the switched-to task number signal output from the task switching control circuit 105 to the task switching control circuit 105. In this manner, the task switching control circuit 105 acquires the coprocessor number of the coprocessor to execute the task to which switching is to be made.

Next, the task switching control circuit 105 outputs a signal to notify whether it has been used for a task before switching and whether it is to be used for a task after switching to each of the coprocessors 102 to 104 based on the information stored in the in-use coprocessor storage register 151 included therein. This signal acts as the arithmetic register data save/restore request signal as it is. The information stored in the in-use coprocessor storage register 151 acts as information indicating a coprocessor used for a task before switching.

Specifically, when switching tasks, a coprocessor that has been used for a task before switching needs to save the contents of operation stored in the arithmetic register 111. Further, when switching tasks, a coprocessor that is to be used for a task after switching needs to restore the saved contents of operation to the arithmetic register 111. Thus, arithmetic register data save/restore request signal is a signal that notifies a coprocessor whether or not to save the contents of operation and whether or not to restore the contents of operation. Together with the signal, the task switching control circuit 105 notifies a switched-to task number to each of the coprocessors 102 to 104. The switched-to task number is notified by the switched-to task number signal.

Further, the task switching control circuit 105 sets the current state of the coprocessors 102 to 104 to the coprocessor status register 152 indicating the task switching status of each of the coprocessors 102 to 104.

The arithmetic register data save/restore circuit 106 located in each of the coprocessors 102 to 104 receives the arithmetic register data save/restore request signal and the switched-to task number signal from the task switching control circuit 105. If the coprocessor has been used before task switching, the arithmetic register data save/restore circuit 106 included in that coprocessor saves the data of the arithmetic register 111 to the memory area of the data memory 112 corresponding to the task number before switching. Further, if the coprocessor is to be used after task switching, the arithmetic register data save/restore circuit 106 included in that coprocessor restores the data of the arithmetic register 111 corresponding to the task number after switching. The task number before switching is read from the task number storage register 161 located in the arithmetic register data save/restore circuit 106.

The arithmetic register data save/restore circuit 106 updates the value of the task number storage register 161 to the task number after switching at the time when the save/restore process ends.

After the save/restore process ends, the arithmetic register data save/restore circuit 106 outputs the arithmetic register save/restore end signal to the task switching control circuit 105.

When the arithmetic register save/restore end signal is output from the arithmetic register data save/restore circuit 106, the task switching control circuit 105 clears a value which corresponds to the coprocessor that has output the arithmetic register save/restore end signal among the values stored in the coprocessor status register 152.

The value of the coprocessor status register 152 is always output to the wait control circuit 107. At the time when the processor core 101 accesses any of the coprocessors 102 to 104, if the task switching process in the coprocessor to be accessed has not ended, the wait control circuit 107 outputs the wait signal to the processor core 101. The wait signal is a signal to halt the processing of the processor core 101 until the task switching process ends.

The task switching control circuit 105 updates the value of the in-use coprocessor storage register 151 when the task switching process in the coprocessors 102 to 104 ends.

An example of the flow of the task switching process in a processor core to which a plurality of coprocessors are connected is described hereinafter with reference to FIGS. 3, 4 and 5, for both cases of using the technique according to related art and using the task switching speed-up circuit 10 according to the exemplary embodiment. Specifically, processes in the case where the technique according to related art is applied and in the case where the technique according to the exemplary embodiment is applied in the configuration shown in FIG. 3 are described.

Figure 3:
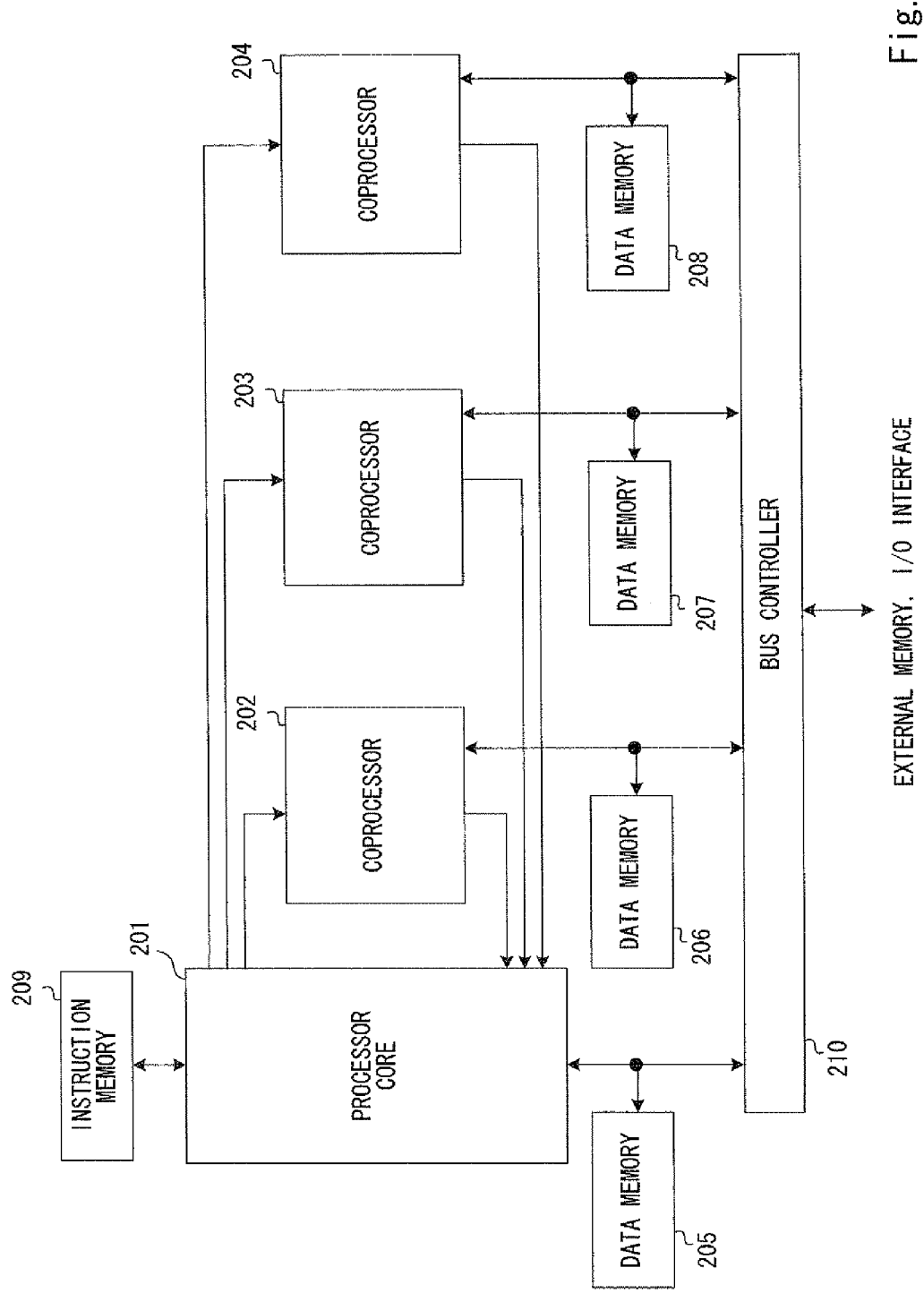
FIG. 3 is a block diagram showing a relationship between a processor and coprocessors according to an exemplary embodiment of the invention.

FIG. 3 is a block diagram showing a relationship between a processor core and coprocessors in the configuration to which each technique is applied. A plurality of coprocessors 202 to 204 are connected to a processor core 201. Data memories 205 to 208 are respectively connected to the processor core 201 and the coprocessors 202 to 204.

At the time of task switching, the save/restore process of data stored in arithmetic registers (not shown) located in the processor core 201 and the coprocessors 202 to 204 are performed respectively by the processor core 201 and the coprocessors 202 to 204 on the data memories 205 to 208 connected thereto. Further, the processor core 201 and the coprocessors 202 to 204 can access the data memories 205 to 208, an external memory (not shown) and an I/O (Input/Output) interface with one another through a bus controller 210.

Figure 4:
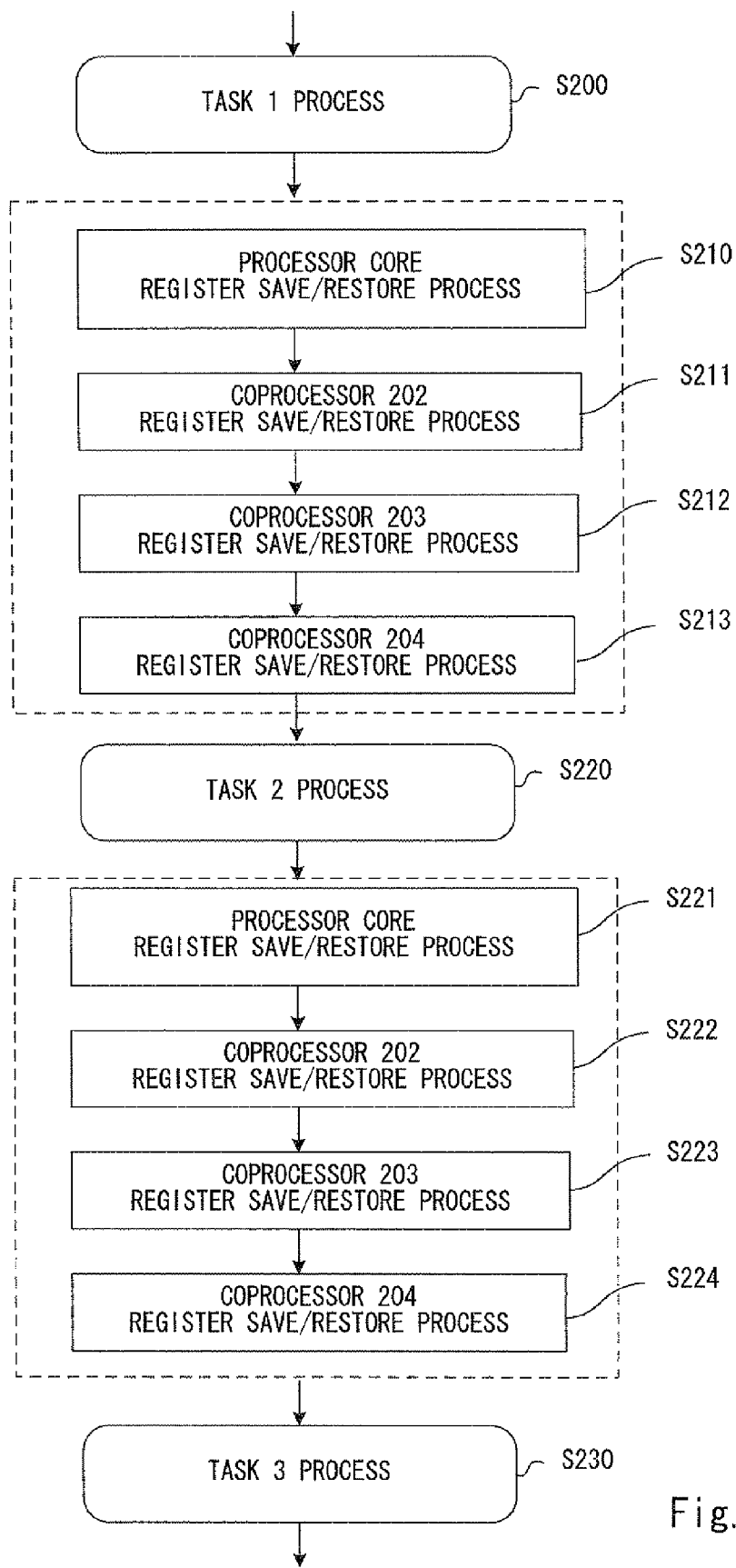
FIG. 4 is a flowchart showing an example of a flow of a task switching process according to related art.

FIG. 4 shows an example of the flow of the task switching process in the case where the technique according to related art is applied to the configuration shown in FIG. 3. In the task switching process according to related art, the processor core 201 performs the save/restore process of data in arithmetic registers one by one on each of the coprocessors 202 to 204.

It is assumed firstly that the processor core 201 and the coprocessors 202 to 204 are in the state of executing a task 1 (S200).

For example, at the time of switching from the task 1 to the task 2 as in FIG. 4, the processor core 201 first performs the save/restore process of data of an arithmetic register in the processor core 201 (S210). Specifically, the processor core 201 saves the contents of operation of the task 1 that is stored in the arithmetic register included therein to the data memory 205. Then, the processor core 201 restores the contents of operation of the task 2 that is stored in the data memory 205 to the arithmetic register included therein.

Next, the processor core 201 performs the save/restore process of data of an arithmetic register in the coprocessor 202 (S211). Specifically, the processor core 201 saves the contents of operation of the task 1 that is stored in the arithmetic register included in the coprocessor 202 to the data memory 206. Then, the processor core 201 restores the contents of operation of the task 2 that is stored in the data memory 206 to the arithmetic register included therein. Thus, the processor core 201 acquires the contents of operation of the task 1 from the arithmetic register included in the coprocessor 202 and stores the acquired contents of operation of the task 1 into the data memory 206. Further, the processor core 201 acquires the contents of operation of the task 2 stored in the data memory 206 and stores the acquired contents of operation of the task 2 into the arithmetic register included in the coprocessor 202.

Then, the processor core 201 performs the save/restore process of data of an arithmetic register in the coprocessor 203 (S212). In this step, the processor core 201 performs the save/restore process of the contents of operation in the same manner as in Step S211.

Finally, the processor core 201 performs the save/restore process of data of an arithmetic register in the coprocessor 204 (S213). In this step, the processor core 201 performs the save/restore process of the contents of operation in the same manner as in Step S211 and S212.

The save/restore process for switching from the task 1 to the task 2 thereby ends in the processor core 201 and the coprocessors 202 to 204. Thus, the processor core 201 and the coprocessors 202 to 204 start a process to execute the task 2 (S220).

When switching from the task 2 to a task 3, the processor core 201 performs the save/restore process of data of an arithmetic register in the same manner as in Steps S210 to S213 (S221 to S224). Then, the processor core 201 and the coprocessors 202 to 204 start a process to execute the task 3 (S230).

As described above, in the task switching process according to related art, the processor core 201 performs the save/restore of data by sequentially accessing the arithmetic registers included in the coprocessors 202 to 204. Therefore, the save/restore process of the coprocessors 202 to 204 can be only done one by one, which takes a very long time.

Figure 5:
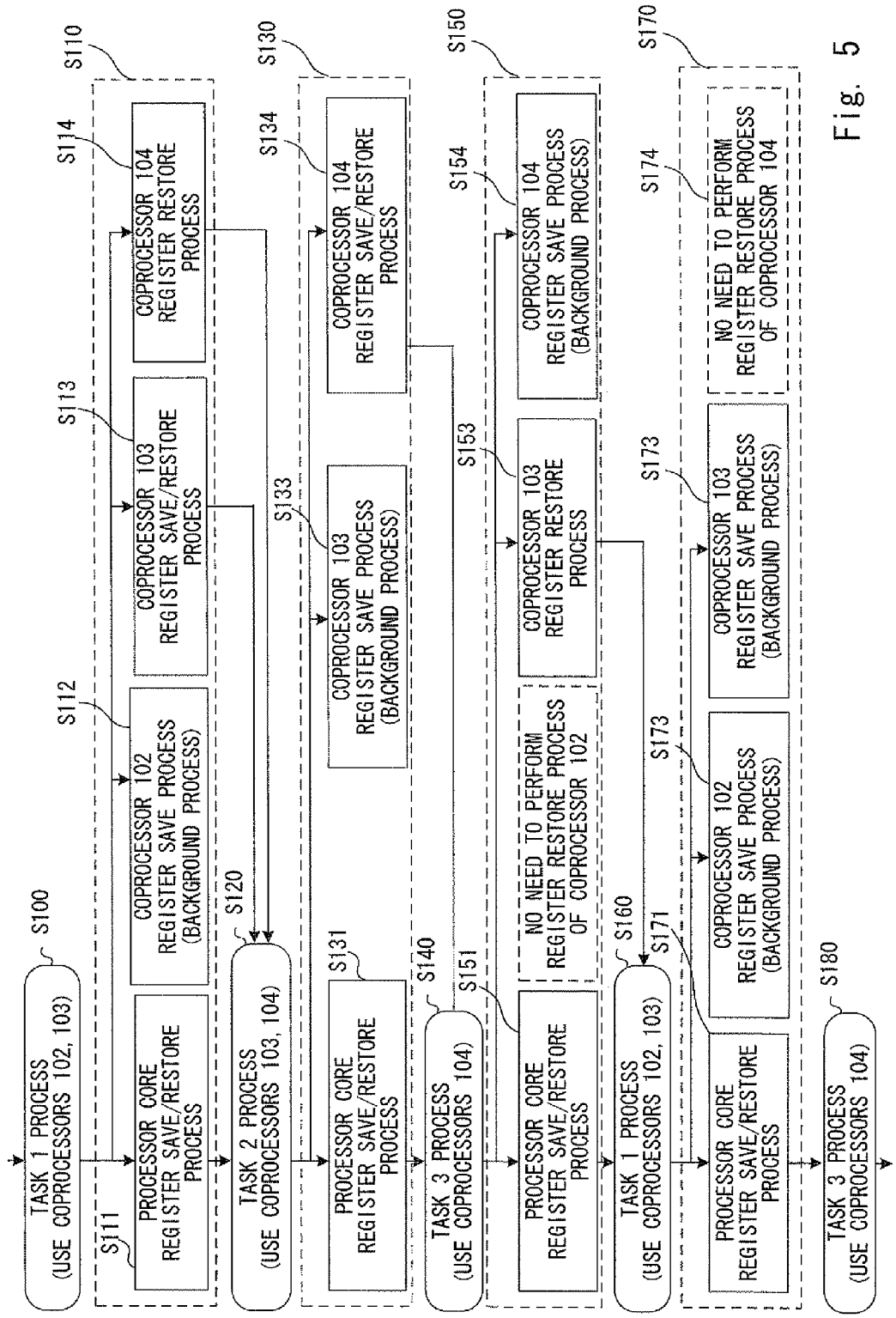
FIG. 5 is a flowchart showing an example of a flow of a task switching process according to an exemplary embodiment of the invention.

FIG. 5 shows an example of the flow of the task switching process in the case where the technique according to exemplary embodiment is applied to the configuration shown in FIG. 3. The application of the technique according to exemplary embodiment to the configuration shown in FIG. 3 produces the task switching speed-up circuit 10. The application of the task switching control circuit 105, the wait control circuit 107 and the task-coprocessor correspondence information table 108 to the processor core 201 produces the processor core 101. The application of the arithmetic register data save/restore circuit 106 to the coprocessors 202 to 204 produces the coprocessors 102 to 104. The data memory 206 is equivalent of the data memory 112, the data memory 207 is equivalent of the data memory 113, and the data memory 208 is equivalent of the data memory 114.

FIG. 5 shows the flow of the process when switching tasks in order of task 1, task 2, task 3, task 1 and task 3, as an example of task switching. It is assumed in this example that the task 1 uses the coprocessors 102 and 103, the task 2 uses the coprocessors 103 and 104, and the task 3 uses the coprocessor 104. Thus, the task-coprocessor correspondence information table 108 contains information associating the task 1 and the coprocessors 102 and 103, information associating the task 2 and the coprocessors 103 and 104, and information associating the task 3 and the coprocessor 104. It is also assumed that the save process and the restore process of data stored in an arithmetic register of the processor core 101 are performed every time.

First, the processor core 101 and the coprocessors 102 and 103 are executing the task 1 (S100).

The task executed in the processor core 101 and the coprocessors 102 and 103 is switched from the task 1 to the task 2 (S110). Specifically, the processor core control circuit 120 outputs the task switching request signal to the task switching control circuit 105, Further, the processor core control circuit 120 outputs the switched-to task number signal indicating the task number of the task 2 to the task switching control circuit 105. Furthermore, the processor core control circuit 120 saves the contents of operation of the task 1 that are stored in an arithmetic register (not shown) included therein to the data memory 205 and restores the contents of operation of the task 2 that are stored in the data memory 205 to the arithmetic register included therein (S111).

The coprocessors 102 and 103 are used for the task 1, and the coprocessors 103 and 104 are used for the task 2. Thus, because the coprocessor 102 is used for the task 1 before switching but not used for the task 2 after switching, it is only necessary to perform the save process. Further, because the coprocessor 103 is used for the task 1 before switching and also used for the task 2 after switching, it is necessary to perform the save process and the restore process. Furthermore, because the coprocessor 104 is not used for the task 1 before switching but used for the task 2 after switching, it is only necessary to perform the restore process.

The determination as to whether or not to perform the save/restore process in this step is specifically described. The task switching control circuit 105 determines a coprocessor to which a request for executing the restore process needs to be made by using the task-coprocessor correspondence information table 108. Specifically, the task switching control circuit 105 outputs the switched-to task number signal that is output from the processor core control circuit 120 to the task-coprocessor correspondence information table 108. The task-coprocessor correspondence information table 108 outputs the coprocessor signal indicating a coprocessor to execute a task with the task number indicated by the switched-to task number signal to the task switching control circuit 105 in response to the switched-to task number signal that is output from the task switching control circuit 105.

Because a task number indicated by the switched-to task number signal is the task 2, the coprocessor signal that is output from the task-coprocessor correspondence information table 108 indicates the coprocessors 103 and 104. Therefore, the task switching control circuit 105 determines that it is necessary to make a request for execution of the restore process to the coprocessors 103 and 104 indicated by the coprocessor signal that is output from the task-coprocessor correspondence information table 108.

Further, the task switching control circuit 105 determines a coprocessor to which a request for executing the save process needs to be made based on the information stored in the in-use coprocessor storage register 151. Because a task that is executed before switching is the task 1, information indicating the coprocessors 102 and 103 that are used by the task 1 is stored in the in-use coprocessor storage register 151. Therefore, the task switching control circuit 105 determines that it is necessary to make a request for execution of the save process to the coprocessors 102 and 103.

Further, the task switching control circuit 105 updates values corresponding to the coprocessors 102 to 104 to which the save process or the restore process is requested in the information stored in the coprocessor status register 152 to the value indicating that it is in the process of task switching.

Therefore, the task switching control circuit 105 outputs the arithmetic register data save/restore request signal to request execution of the save process to the coprocessor 102. The arithmetic register data save/restore circuit 106 of the coprocessor 102 saves the contents of operation of the task 1 stored in the arithmetic register 111 included therein to the data memory 112 in response to the arithmetic register data save/restore request signal that is output from the task switching control circuit 105 (S112). When the save process ends, the arithmetic register data save/restore circuit 106 outputs the arithmetic register data save/restore end signal to the task switching control circuit 105.

Further, the task switching control circuit 105 outputs the arithmetic register data save/restore request signal to request execution of the save process and the restore process to the coprocessor 103. The arithmetic register data save/restore circuit of the coprocessor 103 saves the contents of operation of the task 1 stored in an arithmetic register (not shown) included therein to the data memory 113 and restores the contents of operation of the task 2 stored in the data memory 113 to the arithmetic register included therein in response to the arithmetic register data save/restore request signal that is output from the task switching control circuit 105 (S113). When the save process and the restore process end, the arithmetic register data save/restore circuit outputs the arithmetic register save/restore end signal to the task switching control circuit 105.

Furthermore, the task switching control circuit 105 outputs the arithmetic register data save/restore request signal to request execution of the restore process to the coprocessor 104. The arithmetic register data save/restore circuit of the coprocessor 104 restores the contents of operation of the task 2 stored in the data memory 114 to an arithmetic register (not shown) included therein in response to the arithmetic register data save/restore request signal that is output from the task switching control circuit 105 (S114). When the restore process ends, the arithmetic register data save/restore circuit outputs the arithmetic register save/restore end signal to the task switching control circuit 105.

When the arithmetic register data save/restore end signal is output from the coprocessors 102 to 104, the task switching control circuit 105 updates a value corresponding to the coprocessor that has output the arithmetic register data save/restore end signal in the information stored in the coprocessor status register 152 to the value indicating that it is not in the process of task switching. When the arithmetic register data save/restore end signal is output from all of the coprocessors 102 to 104 to which the save process or the restore process has been requested, the task switching control circuit 105 outputs the task switching end signal to the processor core control circuit 120. Further, the task switching control circuit 105 updates information of the in-use coprocessor storage register 151 to information indicating the coprocessors 103 and 104 that execute the task 2.

The processor core control circuit 120 starts execution of the task 2 in response to the task switching end signal that is output from the task switching control circuit 105 (S120). Specifically, it causes an operation unit included in the processor core 101 to perform arithmetic operation of the task 2. Further, the processor core control circuit 120 outputs the coprocessor number signal indicating the coprocessor numbers of the coprocessor 103 and 104 and the operation control signal to request arithmetic operation of the task 2 to the wait control circuit 107. In response to those signals, the wait control circuit 107 outputs the coprocessor operation control signal to the coprocessor 103 and 104. The arithmetic operation of the task 2 is thereby performed also in operation units of the coprocessor 103 and 104.

As described above, the save process of the arithmetic register of the coprocessor 102, the save and restore processes of the arithmetic register of the coprocessor 103, and the restore process of the arithmetic register of the coprocessor 104 are performed. Because the coprocessor 102 is not used for the task 2, there is no need to wait until the end of the save process of the arithmetic register 111 of the coprocessor 102. To be more specific, because execution of the task 2 becomes possible at the end of the restore process of the coprocessors 103 and 104, it is only necessary to wait until the end of the restore process in the coprocessors 103 and 104. In other words, the task switching control circuit 105 may output the task switching end signal to the processor core control circuit 120 at the point of time when the restore process ends in all of the coprocessors that execute the task after switching.

Therefore, the task switching control circuit 105 may output the task switching end signal to the processor core control circuit 120 when the arithmetic register data save/restore end signal is output from the coprocessor 103 and the coprocessor 104. Alternatively, in the case of executing the save process only, the arithmetic register data save/restore circuit 106 may output the arithmetic register data save/restore request signal immediately in response to the arithmetic register data save/restore request signal even when the save process has not ended. As a result, the save process in the coprocessor 102 is performed in the background. It is thereby possible to reduce the time for task switching in the case where the save process time in the coprocessor 102 is longer than the save and restore process time in the coprocessors 103 and 104.

On the other hand, when the save/restore process has not ended when the operation control signal is output from the processor core control circuit 120, the wait control circuit 107 causes the processor core 101 to wait. Specifically, when, among the coprocessor status signals output from the task switching control circuit 105, a signal which corresponds to the coprocessor indicated by the coprocessor number signal that is output from the processor core control circuit 120 indicates that it is in the process of task switching, the wait control circuit 107 outputs the wait signal to the processor core control circuit 120.

Next, when switching from the task 2 to the task 3 (S130), the processor core control circuit 120 outputs the task switching request signal and the switched-to task number signal indicating the task number of the task 3 to the task switching control circuit 105.

The processor core control circuit 120 saves the contents of operation of the task 2 and restores the contents of operation of the task 3 (S131).

Because the coprocessor 102 is not used for the task 2 before switching and the task 3 after switching, there is no need to do anything on the coprocessor 102. Because the coprocessor 103 is used for the task 2 before switching but not used for the task 3 after switching, it is only necessary to perform the save process. Note that, because the coprocessor 103 does not execute the task 3 after switching, the save process of data stored in the arithmetic register can be performed in the background. Because the coprocessor 104 is used for the task 2 before switching and also used for the task 3 after switching, it is necessary to perform the save process and the restore process.

The determination as to whether or not to perform the save/restore process in this step is specifically described hereinbelow. The task switching control circuit 105 outputs the switched-to task number signal that is output from the processor core control circuit 120 to the task-coprocessor correspondence information table 108. Because the task number indicated by the switched-to task number signal is the task 3, the task-coprocessor correspondence information table 108 outputs the coprocessor signal indicating the coprocessor 104 to the task switching control circuit 105. Therefore, the task switching control circuit 105 determines that it is necessary to make a request for execution of the restore process to the coprocessor 104 indicated by the coprocessor signal.

Further, the information stored in the in-use coprocessor storage register 151 indicates the coprocessors 103 and 104 that execute the task 2. Therefore, the task switching control circuit 105 determines that it is necessary to make a request for execution of the save process to the coprocessors 103 and 104.

Furthermore, the task switching control circuit 105 updates values corresponding to the coprocessors 103 and 104 to which the save process or the restore process is requested in the information stored in the coprocessor status register 152 to the value indicating that it is in the process of task switching.

Thus, because the save process and the restore process are not needed for the coprocessor 102, the task switching control circuit 105 does not output the arithmetic register data save/restore request signal to the coprocessor 102.

Further, the task switching control circuit 105 outputs the arithmetic register data save/restore request signal to request execution of the save process to the coprocessor 103. The arithmetic register data save/restore circuit of the coprocessor 103 thereby perform the save process (S133). Note that the save process in this step is performed in the background as described above. When the save process ends, the arithmetic register data save/restore circuit outputs the arithmetic register data save/restore end signal to the task switching control circuit 105.

Further, the task switching control circuit 105 outputs the arithmetic register data save/restore request signal to request execution of the save process and the restore process to the coprocessor 104. The arithmetic register data save/restore circuit of the coprocessor 104 thereby performs the save process and the restore process (S134). When the save process and the restore process end, the arithmetic register data save/restore circuit outputs the arithmetic register data save/restore end signal to the task switching control circuit 105.

When the arithmetic register data save/restore end signal is output from the coprocessors 103 and 104, the task switching control circuit 105 updates a value corresponding to the coprocessor that has output the arithmetic register data save/restore end signal in the information stored in the coprocessor status register 152 to the value indicating that it is not in the process of task switching. When the arithmetic register data save/restore end signal is output from both of the coprocessors 103 and 104 to which the save process or the restore process has been requested, the task switching control circuit 105 outputs the task switching end signal to the processor core control circuit 120. Further, the task switching control circuit 105 updates information of the in-use coprocessor storage register 151 to information indicating the coprocessor 104 that executes the task 3. The processor core control circuit 120 starts execution of the task 3 in response to the task switching end signal that is output from the task switching control circuit 105 (S140).

Next, when switching from the task 3 to the task 1 (S150), the processor core control circuit 120 outputs the task switching request signal and the switched-to task number signal indicating the task number of the task 1 to the task switching control circuit 105.

The processor core control circuit 120 saves the contents of operation of the task 2 and restores the contents of operation of the task 1 (S151).

Because the coprocessor 102 is used for the task 1 after switching but has not been used since the previous execution the task 1, there is no need to perform the save process and the restore process. Because the coprocessor 103 is not used for the task 3 before switching but used for the task 1 after switching, it is only necessary to perform the restore process. Because the coprocessor 104 is used for the task 3 before switching but not used for the task 1 after switching, it is only necessary to perform the save process. Because the coprocessor 104 does not execute the task 1 after switching, the restore process can be performed in the background.

The determination as to whether or not to perform the save/restore process in this step is specifically described hereinbelow. The task switching control circuit 105 outputs the switched-to task number signal that is output from the processor core control circuit 120 to the task-coprocessor correspondence information table 108. Because the task number indicated by the switched-to task number signal is the task 1, the task-coprocessor correspondence information table 108 outputs the coprocessor signal indicating the coprocessors 102 and 103 to the task switching control circuit 105. Therefore, the task switching control circuit 105 determines that it is necessary to make a request for execution of the restore process to the coprocessors 102 and 103 indicated by the coprocessor signal.

Further, the information stored in the in-use coprocessor storage register 151 indicates the coprocessor 104 that executes the task 3. Therefore, the task switching control circuit 105 determines that it is necessary to make a request for execution of the save process to the coprocessor 104.

Furthermore, the task switching control circuit 105 updates values corresponding to the coprocessors 102 to 104 to which the save process or the restore process is requested in the information stored in the coprocessor status register 152 to the value indicating that it is in the process of task switching.

Therefore, the task switching control circuit 105 outputs the arithmetic register data save/restore request signal to request execution of the restore process to the coprocessor 102. However, although the coprocessor 102 is used for the task 1 after switching, the restore process is not needed as described above.

Thus, the task switching control circuit 105 may refrain from outputting the arithmetic register data save/restore request signal to the coprocessor 102. In this case, the task switching control circuit 105 does not update a value corresponding to the coprocessor 102 in the information stored in the coprocessor status register 152.

Alternatively, the arithmetic register data save/restore circuit 106 of the coprocessor 102 may output the arithmetic register data save/restore end signal to the task switching control circuit 105 without performing the restore process in response to the arithmetic register data save/restore request signal. For example, the task switching control circuit 105 or the arithmetic register data save/restore circuit 106 may store information indicating for which task the contents of operation stored in the arithmetic register 111 are, so that the determination as to whether or not to perform the restore process can be made as above based on the information.

Further, the task switching control circuit 105 outputs the arithmetic register data save/restore request signal to request execution of the restore process to the coprocessor 103. The arithmetic register data save/restore circuit of the coprocessor 103 thereby performs the restore process (S153). When the restore process ends, the arithmetic register data save/restore circuit outputs the arithmetic register data save/restore end signal to the task switching control circuit 105.

Furthermore, the task switching control circuit 105 outputs the arithmetic register data save/restore request signal to request execution of the save process to the coprocessor 104. The arithmetic register data save/restore circuit of the coprocessor 104 thereby performs the save process (S154). The save process in this step is performed in the background as described above. When the save process ends, the arithmetic register data save/restore circuit outputs the arithmetic register data save/restore end signal to the task switching control circuit 105.

When the arithmetic register data save/restore end signal is output from the coprocessor to which the save process or the restore process has been requested, the task switching control circuit 105 updates a value corresponding to the coprocessor that has output the arithmetic register data save/restore end signal in the information stored in the coprocessor status register 152 to the value indicating that it is not in the process of task switching. When the arithmetic register data save/restore end signal is output from all of the coprocessors to which the save process or the restore process has been requested, the task switching control circuit 105 outputs the task switching end signal to the processor core control circuit 120. Further, the task switching control circuit 105 updates information of the in-use coprocessor storage register 151 to information indicating the coprocessors 102 and 103 that execute the task 1. The processor core control circuit starts execution of the task 1 in response to the task switching end signal that is output from the task switching control circuit 105 (S160).

Next, when switching from the task 1 to the task 3 (S170), the processor core control circuit 120 outputs the task switching request signal and the switched-to task number signal indicating the task number of the task 3 to the task switching control circuit 105.

The processor core control circuit 120 saves the contents of operation of the task 1 and restores the contents of operation of the task 3 (S171).

Because the coprocessor 104 is used for the task 3 after switching but has not been used since the previous execution the task 3, there is no need to perform the restore process. Because the coprocessors 102 and 103 are used for the task 1 before switching but not used for the task 3 after switching, it is only necessary to perform the save process. Because the coprocessors 102 and 103 do not execute the task 3 after switching, the save process can be performed in the background.

The determination as to whether or not to perform the save/restore process in this step is specifically described hereinbelow. The task switching control circuit 105 outputs the switched-to task number signal that is output from the processor core control circuit 120 to the task-coprocessor correspondence information table 108. Because the task number indicated by the switched-to task number signal is the task 3, the task-coprocessor correspondence information table 108 outputs the coprocessor signal indicating the coprocessor 104 to the task switching control circuit 105. Therefore, the task switching control circuit 105 determines that it is necessary to make a request for execution of the restore process to the coprocessor 104 indicated by the coprocessor signal.

Further, the information stored in the in-use coprocessor storage register 151 indicates the coprocessors 102 and 103 that execute the task 1. Therefore, the task switching control circuit 105 determines that it is necessary to make a request for execution of the save process to the coprocessors 102 and 103.

Furthermore, the task switching control circuit 105 updates values corresponding to the coprocessors 102 to 104 to which the save process or the restore process is requested in the information stored in the coprocessor status register 152 to the value indicating that it is in the process of task switching.

Therefore, the task switching control circuit 105 outputs the arithmetic register data save/restore request signal to request execution of the save process to the coprocessors 102 and 103. The arithmetic register data save/restore circuits of the coprocessors 102 and 103 thereby perform the save process (S172, S173). The save process in this step is performed in the background as described above. When the save process ends, the arithmetic register data save/restore circuit outputs the arithmetic register data save/restore end signal to the task switching control circuit 105.

Furthermore, the task switching control circuit 105 outputs the arithmetic register data save/restore request signal to request execution of the restore process to the coprocessor 104. However, although the coprocessor 104 is used for the task 1 after switching, the restore process is not needed as described above. Therefore, the task switching control circuit 105 may refrain from performing the restore process just like the coprocessor 102 in Step S150.

When the arithmetic register data save/restore end signal is output from the coprocessor to which the save process or the restore process has been requested, the task switching control circuit 105 updates a value corresponding to the coprocessor that has output the arithmetic register data save/restore end signal in the information stored in the coprocessor status register 152 to the value indicating that it is not in the process of task switching. When the arithmetic register data save/restore end signal is output from all of the coprocessors to which the save process or the restore process has been requested, the task switching control circuit 105 outputs the task switching end signal to the processor core control circuit 120. Further, the task switching control circuit 105 updates information of the in-use coprocessor storage register 151 to information indicating the coprocessor 104 that executes the task 3. The processor core control circuit starts execution of the task 3 in response to the task switching end signal that is output from the task switching control circuit 105 (S180).

After that, the task switching speed-up circuit 10 performs the save/restore process in the same manner in accordance with the task to be executed.

When there is a coprocessor that is used only for one task, the save/restore process of data stored in the arithmetic register may be all skipped.

As described above, in this exemplary embodiment, the task switching control circuit 105 that, when switching a task executed by at least one of the plurality of coprocessors 102 to 104 from the first task to the second task, outputs the arithmetic register data save/restore request signal to request save/restore of the contents of operation stored in the arithmetic register included in the coprocessor to the coprocessor is included. Further, the arithmetic register data save/restore circuit that performs at least one of saving of the contents of operation related to the first task stored in the arithmetic register to the data memory and restoration of the contents of operation related to the second task stored in the data memory to the arithmetic register in response to the arithmetic register data save/restore request signal is included corresponding to each of the coprocessors 102 to 104.

In this configuration, the arithmetic register data save/restore request signal is output in parallel from the task switching control circuit 105 to the arithmetic register data save/restore circuit, so that the save/restore process of the contents of operation can be performed in parallel. It is thereby possible to reduce the time required for task switching in a plurality of coprocessors.

Further, according to the exemplary embodiment, the arithmetic register data save/restore request signal to request the restoration of the contents of operation is output only to the arithmetic register data save/restore circuit corresponding to the coprocessor that performs arithmetic operation of the second task after switching.

Furthermore, the arithmetic register data save/restore request signal to request the saving of the contents of operation is output only to the arithmetic register data save/restore circuit corresponding to the coprocessor that performs arithmetic operation of the first task before switching based on the information stored in the in-use coprocessor storage register 151.

In addition, the arithmetic register data save/restore circuit 106 includes the task number storage register 161 that stores information indicating a task before switching. The arithmetic register data save/restore circuit 106 may refrain from executing at least one of the saving and restoration of the contents of operation when a task indicated by the information that is stored in the task number storage register 161 and a task indicated by the switched-to task number signal that is output from the task switching control circuit 105 are the same.

In this configuration, the saving/restoration of the contents of operation can be carried out only for a coprocessor that requires the saving/restoration of the contents of operation. Because the unnecessary save/restore process is not performed, it is possible to reduce the time required for task switching in a plurality of coprocessors.

Further, according to the exemplary embodiment, the task switching end signal notifying the end of task switching is output to the processor core control circuit 120 when the restoration of the contents of operation ends in a plurality of arithmetic register data save/restore circuits corresponding to a processor that performs arithmetic operation of the second task after switching among a plurality of arithmetic register data save/restore circuits.

In this configuration, arithmetic operation of the second task after switching can be performed while carrying out the save process in the coprocessor that only requires the saving of the contents of operation in the background. This eliminates the need to wait for the save process in the coprocessor that only requires the saving of the contents of operation, and it is thereby possible to further reduce the time required for task switching in a plurality of coprocessors.

Example 1

Figure 6:
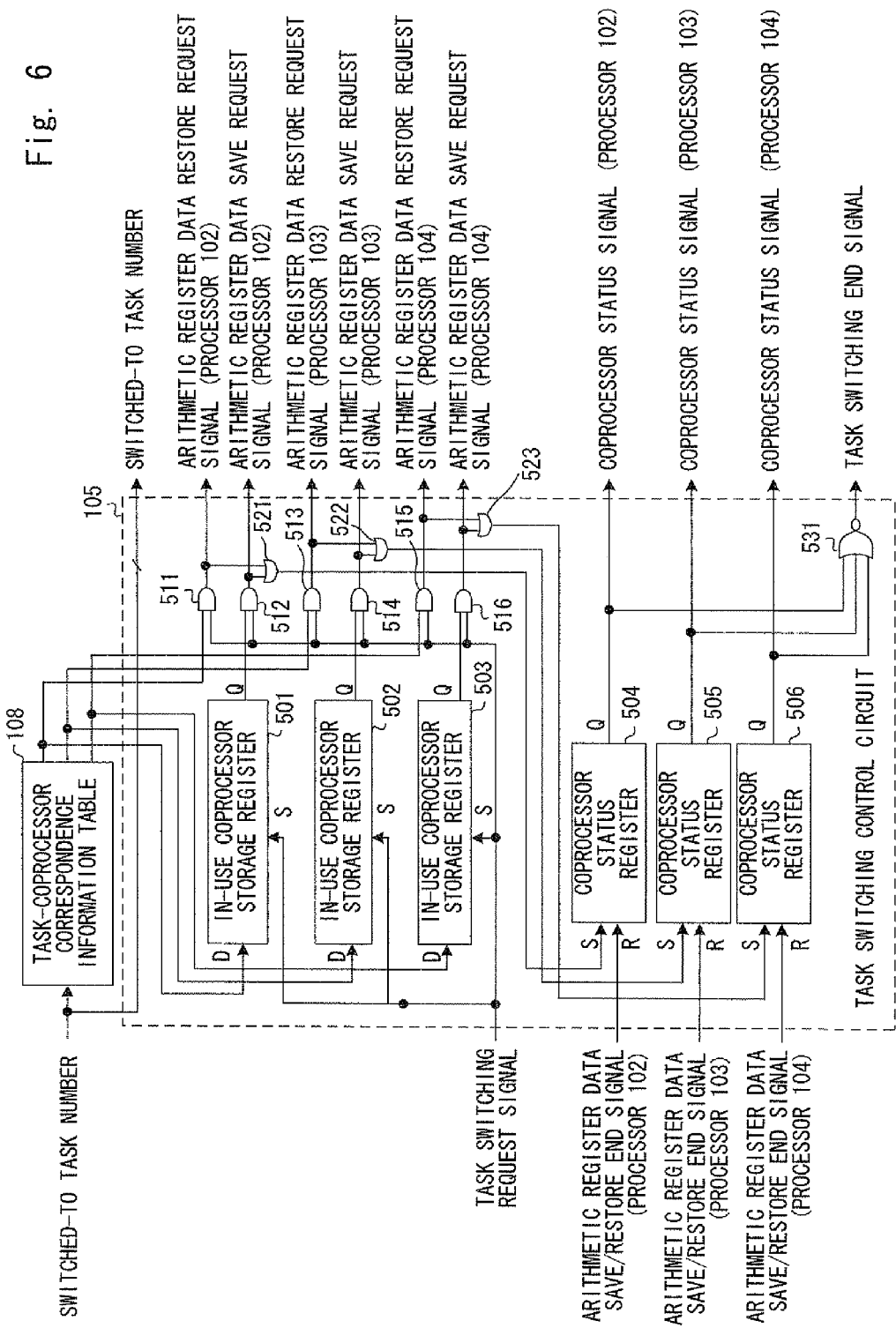
FIG. 6 is a block diagram showing an example of a task switching control circuit used in the task switching speed-up circuit according to the exemplary embodiment of the invention.

FIG. 6 shows an example of the task switching control circuit 105 used in the task switching speed-up circuit 10 according to an exemplary embodiment of the invention. In this example, an example of the task switching control circuit 105 corresponding to three coprocessors 102 to 104 is shown.

The task switching control circuit 105 includes in-use coprocessor storage registers 501 to 503, coprocessor status registers 504 to 506, AND circuits 511 to 516, OR circuits 521 to 523, and NOR circuit 531. FIG. 6 thus shows the case where the in-use coprocessor storage register 151 includes the in-use coprocessor storage registers 501 to 503, and the coprocessor status register 152 includes the coprocessor status registers 504 to 506.

When switching tasks to be executed in the processor cores 102 to 104, the processor core control circuit 120 of the processor core 101 outputs the switched-to task number signal indicating the task number after switching and the task switching request signal indicating the value "1" to request task switching to the task switching control circuit 105. When the switched-to task number signal and the task switching request signal are notified from the processor core control circuit 120, the task switching control circuit 105 first outputs the switched-to task number signal to the task-coprocessor correspondence information table 108.

The task-coprocessor correspondence information table 108 outputs signals corresponding to the coprocessors 102 to 104. In this signal, a signal corresponding to the coprocessor that is used for the task with the task number indicated by the switched-to task number signal is "1", and a signal corresponding to the other coprocessors is "0". Among those signals, the signal corresponding to the coprocessor 102 is output to the in-use coprocessor storage register 501 and the AND circuit 511, the signal corresponding to the coprocessor 103 is output to the in-use coprocessor storage register 502 and the AND circuit 513, and the signal corresponding to the coprocessor 104 is output to the in-use coprocessor storage register 503 and the AND circuit 513.

The AND circuits 511, 513 and 515 perform AND operation of the signals and the task switching request signal. The AND circuits 511, 513 and 515 output signals generated by the AND operation as an arithmetic register data restore request signal to the coprocessors 102 to 104, respectively. Specifically, the AND circuits 511 outputs the generated signal to the coprocessor 102 and the OR circuit 521, the AND circuits 513 outputs the generated signal to the coprocessor 103 and the OR circuit 522, and the AND circuits 515 outputs the generated signal to the coprocessor 104 and the OR circuit 523.

Further, the in-use coprocessor storage registers 501 to 503 correspond to the respective coprocessors 102 to 104. Each of the in-use coprocessor storage registers 501 to 503 stores information indicating whether the corresponding coprocessor 102 to 104 is used for the task before switching. Specifically, each of the in-use coprocessor storage registers 501 to 503 stores "1" when the corresponding coprocessor is used for the task before switching and stores "0" when it is not used for the task before switching. The in-use coprocessor storage register 501 outputs the value stored therein to the AND circuit 512, the in-use coprocessor storage register 502 outputs the value stored therein to the AND circuit 514, and the in-use coprocessor storage register 504 outputs the value stored therein to the AND circuit 516.

The AND circuits 512, 514 and 516 perform AND operation of the values output from the in-use coprocessor storage registers 501 to 503 and the task switching request signal. The AND circuits 512, 514 and 516 output signals generated by the AND operation as an arithmetic register data save request signal to the coprocessors 102 to 104, respectively. Specifically, the AND circuits 512 outputs the generated signal to the coprocessor 102 and the OR circuit 521, the AND circuits 513 outputs the generated signal to the coprocessor 103 and the OR circuit 522, and the AND circuits 514 outputs the generated signal to the coprocessor 104 and the OR circuit 523.

The OR circuits 521 to 523 output the signals obtained by OR operation of the arithmetic register data restore request signal and the arithmetic register data save request signal for each of the coprocessors 102 to 104 to the coprocessor status registers 504 to 506, respectively. The values of the signals output from the OR circuits 521 to 523 are thereby respectively stored into one of the coprocessor status registers 504 to 506 which corresponds to the coprocessor to which the restore process or the save process is requested. The coprocessor status register 504 corresponds to the coprocessor 102, the coprocessor status register 505 corresponds to the coprocessor 103, and the coprocessor status register 506 corresponds to the coprocessor 104. Further, each of the coprocessor status registers 504 to 506 outputs the value stored therein as the coprocessor status signal to the wait control circuit 107 and the NOR circuit 531.

Each of the coprocessor status registers 504 to 506 outputs the value stored therein to the NOR circuit 531 and further outputs it as the coprocessor status signal to the wait control circuit 107. When the task switching end signal is sent back from the coprocessor to which the restore process or the save process has been requested, the coprocessor status register corresponding to the coprocessor clears the value stored therein. The task switching end signal is a signal indicating that the task switching process has ended. Specifically, the coprocessor status signal of the coprocessor status register corresponding to the coprocessor where the switching process is being performed is "1", and the coprocessor status signal of the coprocessor status register corresponding to the coprocessor where the switching process is not being performed is "0". When all of the coprocessor status signals become "0", the NOR circuit 531 sets the task switching end signal to "1" and outputs it to the processor core control circuit 120.

When the task switching end signal with the value "1" is output from the NOR circuit 531, the processor core control circuit 120 outputs the task switching request signal with the value "0" that does not request task switching to the task switching control circuit 105. When the task switching request signal with the value "0" is output from the processor core control circuit 120, each of the in-use coprocessor storage registers 501 to 503 store the signal value output from the task-coprocessor correspondence information table 108. Further, the AND circuits 511 to 516 output the arithmetic register data restore request signal and the arithmetic register data save request signal with the value "0" to the coprocessors 102 to 104 and the OR circuits 521 to 523.

Figure 7:
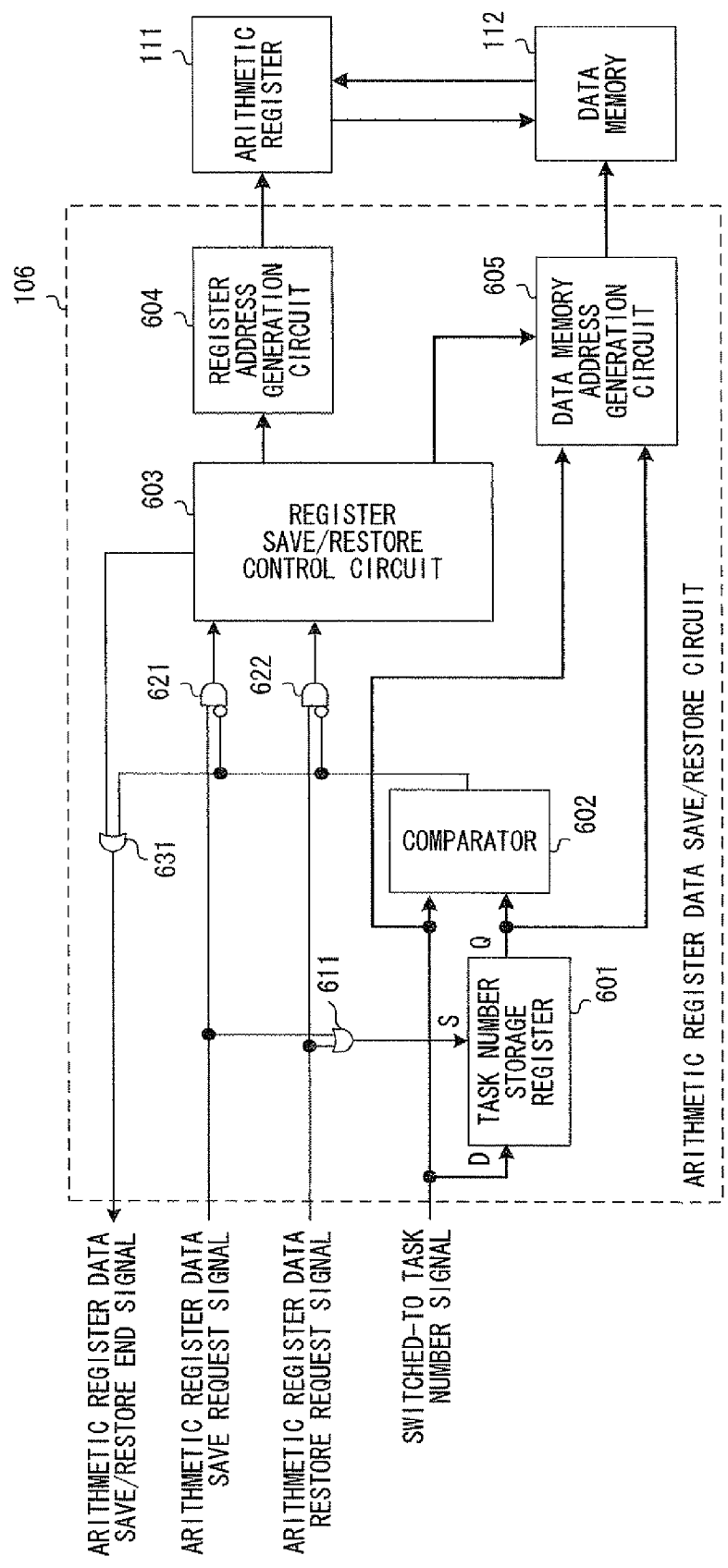
FIG. 7 is a block diagram showing an example of an arithmetic register data save/restore circuit used in the task switching speed-up circuit according to the exemplary embodiment of the invention.

FIG. 7 shows an example of the arithmetic register data save/restore circuit 106 used in the task switching speed-up circuit 10 according to an exemplary embodiment of the invention. The arithmetic register data save/restore circuit 106 is located in each of the coprocessors 102 to 104 that are connected to the processor core 101.

The arithmetic register data save/restore circuit 106 includes a task number storage register 601, a comparator 602, a register save/restore control circuit 603, a register address generation circuit 604, and a data memory address generation circuit 605.

The task number storage register 601 stores the task number of the task for which the coprocessor has been used last time. The task number storage register 601 is equivalent of the task number storage register 161. The task number storage register 601 outputs the signal indicating the task number stored therein to the comparator 602 and the data memory address generation circuit 605.

The comparator 602 compares the task number indicated by the switched-to task number signal that is output from the task switching control circuit 105 and the task number indicated by the signal that is output from the task number storage register 601. When the task numbers match, the comparator 602 outputs a signal indicating "1" and, when the task numbers do not match, it outputs a signal indicating "0". The signal output from the comparator 602 is input to AND circuits 621 and 622 and an OR circuit 631. Note that the signal output from the comparator 602 is inverted and input to the AND circuits 621 and 622.

The AND circuits 621 and 622 perform AND operation of the arithmetic register data save request signal and the arithmetic register data restore request signal that are output from the task switching control circuit 105 and the inverted signal of the signal that is output from the comparator 602. The AND circuits 621 and 622 output the signal generated by the AND operation to the register save/restore control circuit 603. Specifically, when the task numbers match, the arithmetic register data save request signal and the arithmetic register data restore request signal are ignored. This is because, when the previous task number is the same, the value to be used is already stored in the arithmetic register 111 and therefore there is no need to perform the save/restore process. Further, in this case, the OR circuit 631 performs OR operation of the signal indicating "1" that is output from the comparator 602. Thus, the OR circuit 631 outputs the arithmetic register data save/restore end signal indicating the value "1" notifying that the save/restore process has ended to the task switching control circuit 105.

The register save/restore control circuit 603 receives the arithmetic register data save request signal and the arithmetic register data restore request signal through the AND circuits 621 and 622 and then starts the save process or the restore process according to the values of those signals. Specifically, when the value of the arithmetic register data save request signal that is output from the AND circuit 621 is "1", the register save/restore control circuit 603 performs the save process. Further, when the value of the arithmetic register data restore request signal that is output from the AND circuit 622 is "1", the register save/restore control circuit 603 performs the restore process.

When performing the save process or the restore process, the register save/restore control circuit 603 activates the register address generation circuit 604 and the data memory address generation circuit 605. The register address generation circuit 604 generates the arithmetic register number at the time of saving or restoration. The data memory address generation circuit 605 generates the address of the data memory for the saving or restoration of the arithmetic register value. Note that the switched-to task number signal that is output from the task switching control circuit 105 and the signal that is output from the task number storage register 601 are input to the data memory address generation circuit 605. Thus, the switched-to task number and the switched-from task number are also used for the data memory address generation. This is because it is necessary to change the address of the data memory 112 to perform the saving or restoration of data for the arithmetic register 111 according to the task number.

The data memory address generation circuit 605 generates the address in the data memory 112 to which data of the arithmetic register 111 is to be saved based on the switched-from task number. The data memory address generation circuit 605 generates the address in the data memory 112 in which data to be restored to the arithmetic register 111 is stored based on the switched-to task number. The register save/restore control circuit 603 transfers data between the arithmetic register 111 and the data memory 112 by using the addresses generated by the register address generation circuit 604 and the data memory address generation circuit 605.

When the task switching process ends in all of the coprocessors 102 to 104, the arithmetic register data restore request signal and the arithmetic register data save request signal with the value "0" are input to an OR circuit 611 and the AND circuits 621 and 622. In this case, the OR circuit 611 outputs the signal indicating the OR operation result "0" to the task number storage register 601. When the signal indicating "0" is output from the OR circuit 611, the task number storage register 601 updates the value stored therein to the switched-to task number indicated by the switched-to task number signal.

Figure 8:
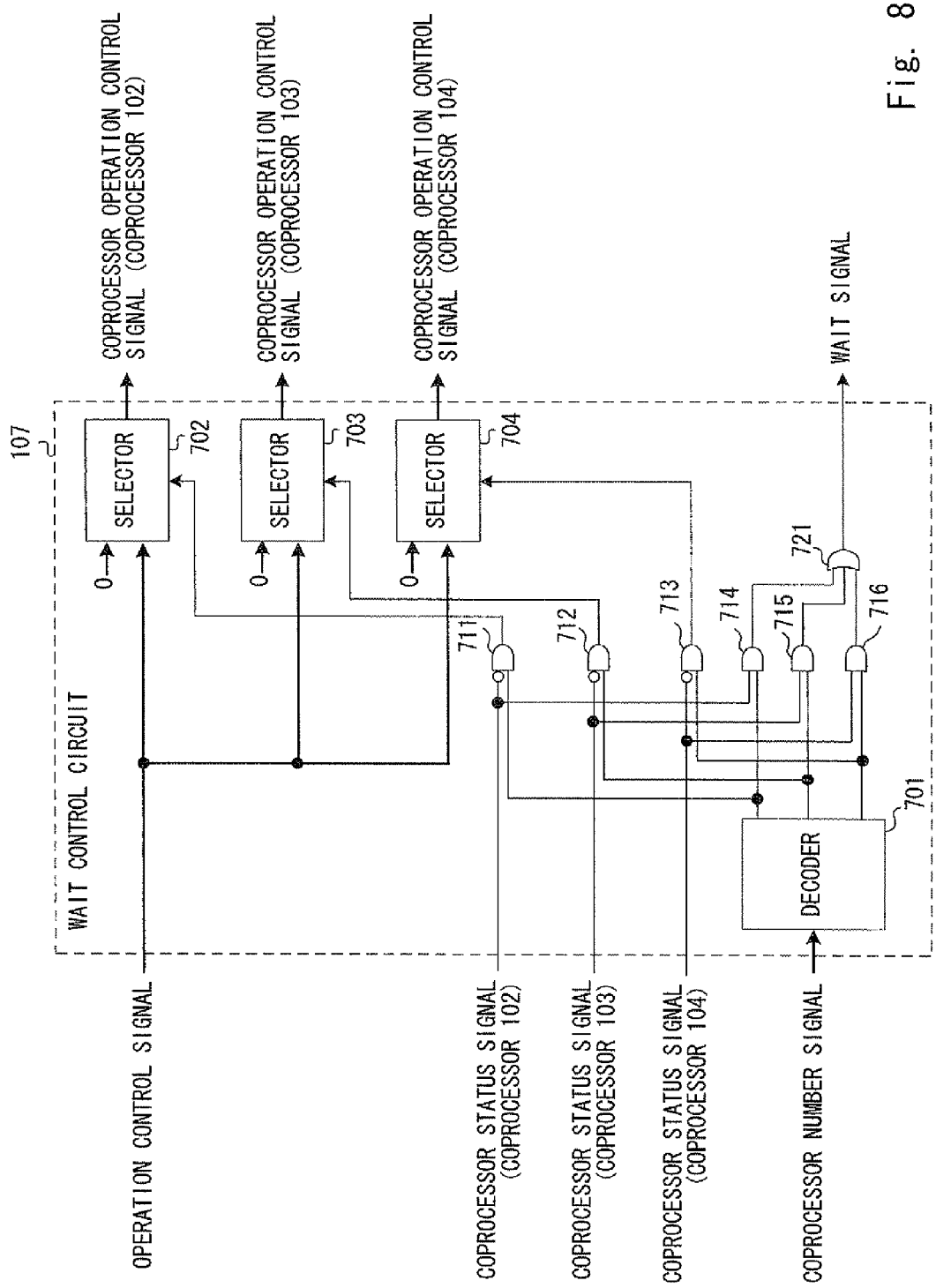
FIG. 8 is a block diagram showing an example of a wait control circuit used in the task switching speed-up circuit according to the exemplary embodiment of the invention.

FIG. 8 shows an example of the wait control circuit 107 used in the task switching speed-up circuit 10 according to an exemplary embodiment of the invention.

The wait control circuit 107 includes a decoder 701, selectors 702 to 704, AND circuits 711 to 716, and an OR circuit 721.

When the processor core control circuit 120 of the processor core 101 makes control such as requesting operation to the coprocessors 102 to 104, it outputs the coprocessor number signal indicating the number of the coprocessor for which control is to be made and the operation control signal indicating the details of the control to the wait control circuit 107. The decoder 701 converts the processor number signal that is output from the processor core control circuit 120 into a signal with the width of the number of coprocessors where a bit corresponding to the coprocessor designated as the target of control by the processor core control circuit 120 is "1" and outputs the signal. Specifically, the decoder 701 outputs the signal corresponding to the coprocessor 102 to the AND circuits 711 and 714, outputs the signal corresponding to the coprocessor 103 to the AND circuits 712 and 715, and outputs the signal corresponding to the coprocessor 104 to the AND circuits 713 and 716.

The AND circuits 711 to 713 perform AND operation of the signal that is output from the decoder 701 and the signal inverted from the coprocessor status signal that is output from the task switching control circuit 105. The AND circuits 711 to 713 output signals generated by the AND operation as a data selection signal to the selectors 702 to 704. Specifically, the coprocessor status signal that is output from the coprocessor status register 504 is input to the AND circuits 711 and 714, the coprocessor status signal that is output from the coprocessor status register 505 is input to the AND circuits 712 and 715, and the coprocessor status signal that is output from the coprocessor status register 506 is input to the AND circuits 713 and 716. Further, the AND circuit 711 outputs the generated signal to the selector 702, the AND circuit 712 outputs the generated signal to the selector 703, and the AND circuit 713 outputs the generated signal to the selector 704.

Each of the selectors 702 to 704 selects the operation control signal output from the processor core control circuit 120 or "0" for each processor. When the data selection signal is "0", the selector 702 to 704 outputs "0" to the corresponding coprocessor, and when the data selection signal is "1", the selector 702 to 704 outputs the operation control signal to the corresponding coprocessor. Thus, the operation control signal is output as the coprocessor operation control signal to the coprocessor designated by the coprocessor number only when the coprocessor status signal of that coprocessor is "0". It is thereby possible to inhibit a request for operation to the coprocessor that is in the process of task switching from the processor core control circuit 120.

On the other hand, the AND circuits 714 to 716 perform AND operation of the signal that is output from the decoder 701 and the coprocessor status signal that is output from the task switching control circuit 105. The AND circuits 714 to 716 output signals generated by the AND operation to the OR circuit 721. The OR circuit 721 performs OR operation of the signals that are output from the AND circuits 714 to 716. The OR circuit 721 outputs a signal generated by the OR operation as the wait signal to the processor core control circuit 120. Thus, when the coprocessor status signal of the coprocessor designated as the coprocessor number for which control is to be made is "1", the wait signal is "1", and the processing of the processor core 101 stops. This thus gives a function to halt the processor core 101 until the save process or the restore process ends when the processor core 101 accesses a coprocessor in which the save process or the restore process of the arithmetic register data has not ended. It is thereby possible to inhibit a request for operation to the coprocessor that is in the process of task switching from the processor core control circuit 120.

It should be noted that the present invention is not restricted to the above-described exemplary embodiment, and various changes and modifications may be made without departing from the scope of the invention.

Although the case where the number of coprocessors is three is described by way of illustration in the exemplary embodiment, the number of coprocessors is not limited thereto.

Further, although the values of signals that are input to or output from the circuits 105, 106, 107 and 120 are "0" or "1" in the above description, they are not limited to such values.

The present invention may be applied also to a signal processing LSI used in a mobile telephone or AV device.

This application is based upon and claims the benefit of priority from Japanese patent application No. 2010-104880, filed on Apr. 30, 2010, the disclosure of which is incorporated herein in its entirety by reference.

REFERENCE SIGNS LIST

10 Task Switching Speed-Up Circuit 10
30 Information Processing Device
101, 201, 301 Processor Core
102, 103, 104, 202, 203, 204, 311, 312, 31N Coprocessor
105 Task Switching Control Circuit
106 Arithmetic Register Data Save/Restore Circuit
107 Wait Control Circuit
108 Task-Coprocessor Correspondence Information Table
109 Coprocessor Operation Control Circuit
110 Coprocessor Operation Unit
111 Arithmetic Register
112, 113, 114, 205, 206, 207, 208 Data Memory
120 Processor Core Control Circuit
151 In-Use Coprocessor Storage Register
152 Coprocessor Status Register
161 Task Number Storage Register
209 Instruction Memory
210 Bus Controller
302 Task Switching Control Unit
321, 322, 32n Operation Unit
331, 332, 33n Operation Storage Unit
341, 342, 34n Save/Restore Unit
351, 352, 35n Save Storage Unit
501, 502, 503 In-Use Coprocessor Storage Register
504, 505, 506 Coprocessor Status Register
601 Task Number Storage Register
602 Comparator
603 Register Save/Restore Control Circuit
604 Register Address Generation Circuit
605 Data Memory Address Generation Circuit
701 Decoder Circuit
702, 703, 704 Selector

What is claimed is:
1. An information processing device comprising:
a processor core;
a plurality of coprocessors, each of the plurality of coprocessors including an operation unit that performs operation in response to a request from the processor core, and a corresponding operation storage unit that stores contents of operation of the operation unit;
a plurality of save storage units respectively corresponding to the plurality of coprocessors in a one-to-one manner, each of the plurality of save storage units storing the contents of operation saved from a corresponding one of the operation storage units;
a task switching control unit that outputs a save/restore request signal requesting saving/restoration of the contents of operation when switching a task on which operation is performed by the plurality of coprocessors from a first task to a second task; and a plurality of save/restore units respectively corresponding to the plurality of coprocessors, a wait control unit that monitors the request of the operation from the processor core to the plurality of coprocessors, wherein the task switching control unit outputs the save/restore request signal to the plurality of save/restore units in parallel, each of the plurality of save/restore units performs at least one of saving of the contents of operation related to the first task stored in the operation storage unit to the save storage unit and restoration of the contents of operation related to the second task stored in the save storage unit to the operation storage unit in response to the save/restore request signal, the wait control unit halts processing of the processor core when the processing of the processor core is started before the at least one of saving and restoration in all of the plurality of save/restore units has been finished and when the operation is requested to at least one of the plurality of coprocessors corresponding to at least one of the plurality of save/restore units in which the at least one of saving and restoration has not been finished, the wait control unit restarts the processing of the processor core when the at least one of saving and restoration in the at least one of the plurality of save/restore units corresponding to the at least one of the plurality of coprocessors to which the operation is requested has been finished.

2. The information processing device according to claim 1, wherein the save/restore unit includes a task information storage unit that stores task information indicating a task before switching, the task switching control unit outputs task information indicating the second task to the save/restore unit together with the save/restore request signal, when the task information output from the task switching control unit and the task information stored in the task information storage unit are the same, the save/restore unit does not perform saving and restoration of the contents of operation and stores the task information output from the task switching control unit into the task information storage unit.

3. The information processing device according to claim 1, wherein the save/restore request signal contains a save request signal requesting saving of contents of operation of a task before switching and a restore request signal requesting restoration of contents of operation of a task after switching, and the task switching control unit outputs the restore request signal requesting restoration of contents of operation of the second task only to the save/restore unit corresponding to a coprocessor that performs operation of the second task among the plurality of save/restore units.

4. The information processing device according to claim 3, wherein the task switching control unit includes a coprocessor information storage unit that stores coprocessor information indicating a coprocessor that performs operation of a task before switching, and the task switching control unit outputs the save request signal only to the save/restore unit corresponding to a coprocessor that performs operation of the first task among the plurality of save/restore units based on the coprocessor information, and stores coprocessor information indicating a coprocessor that performs operation of the second task into the coprocessor information storage unit.

5. The information processing device according to claim 4, further comprising:

a correspondence information storage unit that stores correspondence information associating the task and a coprocessor that performs operation of the task, wherein the processor core includes a processor core control unit that manages tasks on which operation is performed by the plurality of coprocessors, the processor core control unit outputs task information indicating the second task to the task switching control unit when switching from the first task to the second task, and the task switching control unit specifies a coprocessor that performs operation of the second task indicated by the task information output from the processor core control unit based on the coprocessor information, outputs the restore request signal to the save/restore unit corresponding to the specified coprocessor, and stores coprocessor information indicating the specified coprocessor into the coprocessor information storage unit.

6. The information processing device according to claim 1, wherein the processor core includes a processor core control unit that manages tasks on which operation is performed by the plurality of coprocessors, the task switching control unit outputs a task switching end signal notifying end of switching from the first task to the second task to the processor core control unit when restoration of contents of operation in the save/restore unit corresponding to the coprocessor that performs operation of the second task among the plurality of save/restore unit ends, and the processor core control unit requests operation of the second task to the coprocessor in response to the task switching end signal.

7. The information processing device according to claim 1, wherein the processor core includes the task switching control unit, and each of the plurality of coprocessors includes a corresponding one of the plurality of save/restore units.

8. A task switching method comprising:

outputting, by a processor core, a save/restore request signal requesting saving/restoration of contents of operation of a task to a plurality of coprocessors that perform operation of a task in response to a request from the processor core when switching a task on which operation is performed by the plurality of coprocessors from a first task to a second task in parallel, and performing, by each of the plurality of coprocessors, at least one of saving of the contents of operation of the first task and restoration of the contents of operation of the second task in response to the save/restore request signal output from the processor core, halting processing of the processor core when the processing of the processor core is started before the at least one of saving and restoration in all of the plurality of s-coprocessors has been finished and when the operation is requested to at least one of the plurality of coprocessors in which the at least one of saving and restoration has not been finished, restarting the processing of the processor core when the at least one of saving and restoration in the at least one of the plurality of coprocessors to which the operation is requested has been finished.

9. An information processing device comprising:
a processor core;
a plurality of coprocessors, each of the plurality of coprocessors including an operation means for performing operation in response to a request from the processor core, and a corresponding operation storage means for storing contents of operation of the operation means;
a plurality of save storage means respectively corresponding to the plurality of coprocessors in a one-to-one manner, each of the plurality of save storage means for storing the contents of operation saved from a corresponding one of the operation storage means;
a task switching control means for outputting a save/restore request signal requesting saving/restoration of the contents of operation when switching a task on which operation is performed by the plurality of coprocessors from a first task to a second task; and
a plurality of save/restore means respectively corresponding to the plurality of coprocessors,
a wait control means for monitoring the request of the operation from the processor core to the plurality of coprocessors, wherein
the task switching control means outputs the save/restore request signal to the plurality of save/restore means in parallel,
each of the plurality of save/restore means performs at least one of saving of the contents of operation related to the first task stored in the operation storage means to the save storage means and restoration of the contents of operation related to the second task stored in the save storage means to the operation storage means in response to the save/restore request signal,
the wait control means halts processing of the processor core when the processing of the processor core is started before the at least one of saving and restoration in all of the plurality of save/restore means has been finished and when the operation is requested to at least one of the plurality of coprocessors corresponding to at least one of the plurality of save/restore means in which the at least one of saving and restoration has not been finished,
the wait control means restarts the processing of the processor core when the at least one of saving and restoration in the at least one of the plurality of save/restore means corresponding to the at least one of the plurality of coprocessors to which the operation is requested has been finished.

* * * * *